Patented Jan. 1, 1952

2,580,742

UNITED STATES PATENT OFFICE 2,580,742

PURIFICATION OF DINITRO COMPOUNDS

Thomas F. Doumani, Los Angeles, and Robert W. Long, San Pedro, Calif., assignors to Union Oil Company of California, Los Angeles, Calif., a corporation of California No Drawing. Application April 25, 1949, Serial No. 89,578

11 Claims. (Cl. 260—644)

This invention relates to an improved process for the purification of certain organic dinitro compounds, and in particular concerns a method for purifying organic dinitro compounds in which a nitro group is attached to each of two adjoining carbon atoms in a saturated chain or ring. Such compounds may be defined by the formula

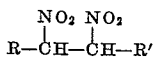

wherein R and R' each represents a hydrogen atom or an alkyl group, or R and R' are joined together to represent a saturated alkylene group.

It is known that aliphatic and cycloaliphatic hydrocarbons undergo reaction with nitrogen oxides or nitric acid under certain conditions to form a variety of nitrated products including compounds in which a nitro group is attached to each of two adjacent carbon atoms in a saturated chain or ring. Thus, for example, cyclohexane and cyclohexene may be reacted with nitrogen tetroxide or nitric acid to form a mixture of nitrated products including 1,2-dinitrocyclohexane, isomeric dinitrocyclohexanes, mono-nitrocyclohexane, mono- and di-cyclohexyl nitrites, nitrito-nitrocyclohexanes, nitrocyclohexanols, nitroso-cyclohexanes, cyclohexyl nitrates, etc. The proportions in which these various products are formed depends upon the particular nitrating agent employed as well as upon the conditions under which the reaction is carried out. In no case, however, has it been found possible to effect the reaction in such manner that the 1,2-dinitro compound is formed exclusively, and accordingly such compound has heretofore been separated from the reaction mixture and purified by a combination of distillation and crystallization operations. The purification of 1,2-dinitrocyclohexane by crystallization from organic solvent solutions, however, is very unsatisfactory since the impurities associated with the desired product are almost equally soluble in organic solvents. Moreover, organic solvent solutions of 1,2-dinitrocyclohexane are relatively stable in the supersaturated state, thereby necessitating the use of seeding techniques and cooling to very low temperatures to induce crystallization of the solid compound. Similar difficulties are encountered in the purification of other dinitro compounds in which the nitro groups are attached to adjacent carbon atoms joined by a single bond.

It is accordingly an object of the invention to provide an improved method for the purification of dinitro compounds in which the two nitro groups are attached to adjacent carbon atoms in a saturated chain or ring.

Another object is to provide improved means for separating such compounds from mixtures obtained by the direct nitration of aliphatic or cycloaliphatic hydrocarbons.

Another object is to provide improved means for separating such compounds from mixtures obtained by reaction between an aliphatic or cycloaliphatic olefin and nitrogen tetroxide.

A further object is to provide means for separating dinitro compounds in which the two nitro groups are attached to adjacent carbon atoms in a saturated chain or ring from the corresponding nitrito-nitro compounds.

A still further object is to provide an improved method for the purification of 1,2-dinitrocyclohexane.

Other objects will be apparent from the following detailed description of the invention, and various advantages not specifically referred to herein will occur to those skilled in the art upon employment of the invention in practice.

We have found that the above and related objects may be realized in a process whereby mixtures comprising the aforesaid dinitro compounds are subjected to oxidation with nitric acid. More particularly, we have found that saturated aliphatic and cycloaliphatic dinitro compounds in which the two nitro groups are attached to adjacent carbon atoms are remarkably resistant to oxidation by aqueous nitric acid, whereas the various other nitrated products normally incident with such dinitro compounds, e. g., the corresponding nitrito-nitro compounds, are readily oxidized by nitric acid to form dibasic acids and other products from which the aforementioned dinitro compounds are readily separated by conventional means.

The invention thus consists in the separation of saturated aliphatic or cycloaliphatic dinitro compounds in which the two nitro groups are attached to adjacent carbon atoms from admixture with other normally incident nitrated compounds, e. g., from the mixture obtained by the direct nitration of the corresponding saturated or unsaturated hydrocarbon, by subjecting such mixture to oxidation with nitric acid, and thereafter separating said dinitro compound from the oxidized product. Such procedure is very readily carried out under relatively mild operating conditions, and provides a highly efficient method for obtaining substantially pure dinitro compounds of the aforesaid class directly from the crude reaction mixtures in which they are initially obtained. Furthermore, dibasic acids are formed as by-products in the present process and constitute valuable products which can readily be recovered and employed for various uses.

In carrying out the process of the invention, the optimum conditions for effecting the oxidation reaction will depend upon the nature of the mixture to be purified. In some cases the impurities associated with the dinitro compound are more susceptible to oxidation than in others. Accordingly, it will be understood that while the limits herein specified for the various operating conditions of time, temperature, pressure, concentration, etc. apply in general to various impure mixtures, the optimum set of conditions will be determined by the composition of the particular mixture being treated. Thus, for example, where the mixture subjected to the process consists substantially only of nitrito-nitro compounds and a dinitro compound of the present class, the oxidation reaction may be carried out at relatively low temperatures and with nitric acid of relatively low concentration since the nitrito-nitro compounds as a class are relatively easily oxidized. Alternatively, when treating a mixture of isomeric dinitro compounds, relatively stringent oxidizing conditions will be employed since such compounds are more resistant to oxidation. Inasmuch as it is preferable to employ operating conditions as mild as possible in order to avoid undue decomposition of the valuable dibasic acid by-products, it will be advantageous, particularly when operating on a large scale with a feed stock of constant composition, to predetermine the conditions of time, temperature, pressure, concentration, etc. which provide the best yield of the valuable by-products consistent with effecting the desired selective oxidation.

The nitric acid which is employed as the oxidizing agent in the present process may vary in concentration from as low as 5 per cent by weight to as high as 90 per cent by weight. Ordinarily it will be of a concentration between about 30 and about 70 per cent by weight. Such acid is usually employed in an amount somewhat in excess of the theoretical in order to insure complete oxidation of all oxidizable components of the mixture. Thus, for example, where the feed stock is the initial reaction product resulting from the nitration of cyclohexane, and comprises, for example 2 moles of 1,2-dinitrocyclohexane, 8 moles of other nitro and nitrito derivatives of cyclohexane, and 20 moles of inert material, such as the inert reaction solvent remaining from the nitration reaction, it is preferred to employ somewhat more than 8, e. g. 12–80, equivalents of nitric acid.

The oxidation reaction may be carried out at temperatures between about 80° and about 300° C., preferably between about 100° C. and about 200° C., the optimum temperature depending upon the nature of the mixture being treated as well as upon the other operating conditions, e. g. nitric acid concentration, reaction time, etc. Ordinarily it is convenient to carry out the reaction under atmospheric pressure at the reflux temperature of the reaction mixture. If desired, however, higher temperatures within the aforementioned range may be employed, in which case superatmospheric pressures will be necessary.

The time required for completion of the reaction whereby the impurities associated with the desired dinitro compound are selectively oxidized may vary from as little as one second to several hours or more, depending upon the nature and quantity of such impurities as well as upon the conditions under which the reaction is carried out. Ordinarily, completion of the reaction is indicated by the cessation or diminution of the evolution of brown nitrogen dioxide fumes from the mixture undergoing reaction.

Upon completion of the reaction, the unaffected dinitro compound may readily be separated from the oxidized products by various means. Inasmuch as such oxidized products for the most part comprise dibasic acids considerably more soluble in water than the dinitro compound, it is convenient to dilute the reaction product with water, and thereafter separate the non-aqueous phase which comprises the desired dinitro compound together with any inert reaction solvent which may have been present. If desired, the aqueous phase may be extracted with a suitable organic solvent to recover small amounts of the desired dinitro compound which may be contained therein. Alternatively, the entire reaction product may be extracted with suitable organic solvent to separate the dinitro compound from the oxidized impurities. Separation of the dinitro compound from the aforementioned reaction solvent or from the solvent employed in its extraction may readily be accomplished by fractional distillation or crystallization since the nature and physical properties of the dinitro compound and the solvent will be quite diverse.

The following examples will illustrate several ways in which the principle of the invention may be applied, but are not to be construed as limiting the same. All proportions are given in parts by weight.

Example I

A mixture of nitrated cyclohexanes obtained by reacting cyclohexane with nitric acid in the known manner is fractionally distilled whereby there is obtained a high-boiling fraction consisting of a mixture of isomeric dinitrocyclohexanes. Fifty parts of this mixture are slowly added to approximately 200 parts of boiling nitric acid of 70 per cent concentration. The mixture is then heated at reflux temperature (118°–123° C.) for one hour, during which time nitrogen dioxide is evolved. The mixture is then allowed to cool to room temperature and is diluted with several times its volume of water. The organic layer is drawn off, and the aqueous layer is extracted several times with ether. The ether extracts are then combined with the organic layer, and the ether is removed by evaporation. The resulting oily liquid is taken up in methyl alcohol, and upon cooling, the methyl alcohol solution deposits 15.7 parts of 1,2-dinitrocyclohexane substantially free from the isomeric dinitrocyclohexanes originally present in the starting material.

Example II

A solution of 98 parts of cyclohexene in 700 parts of diethyl ether is added slowly and with stirring to a solution of 46 parts of nitrogen tetroxide in 700 parts of diethyl ether at a temperature of about 24° C. over a period of about 1.25 hours. Upon standing for 24 hours, cyclohexane dinitrosite crystallizes out of solution as a colorless solid. This product is filtered off, and the ether is evaporated, whereby there is obtained 169 parts of a heavy oil which comprises about 20 per cent of 1,2-dinitrocyclohexane and 80 per cent of a mixture of nitrito-nitrocyclohexane and nitrocyclohexanol. Fifty parts of this product are added slowly to 285 parts of boiling nitric acid of 70 per cent concentration over a period of two hours. Heating at reflux temperature is continued for another hour, after which the mixture is cooled and diluted with water. The oily layer which is thereby separated amounts to about 9 parts and consists of 1,2-dinitrocyclohexane of a fair degree of purity. The aqueous phase is evaporated and the solid product which is thereby precipitated is recrystallized from aqueous solution, whereby there is obtained a crystalline product having an acid number corresponding to that of adipic acid.

Example III

The crude product obtained by nitrating ethylene with nitrogen tetroxide, and essentially comprising 1,2-dinitro-ethane and 1-nitro-2-nitrito-ethane, is heated at reflux temperature with 70 per cent aqueous nitric acid for about 2 hours. The mixture is then taken up in water and extracted with diethyl ether. 1,2-dinitro-ethane of a high purity is obtained from the extract phase by evaporating off the ether.

It will be apparent from the foregoing that the process of the invention is adapted to be carried out in a number of ways, either continuously or batch-wise, and a number of modifications within the scope of the invention will be apparent to those skilled in the art. Ordinarily, it is desirable in the interests of economy that the product subjected to the present purification process contain as high a proportion of the desired dinitro compound as possible. Thus, in preparing 1,2-dinitrocyclohexane by the nitration of cyclohexane with nitrogen tetroxide, for example, it is desirable that the crude reaction product be freed as far as possible from any reaction solvent which may have been employed, as well as from unreacted cyclohexane and low-boiling nitrated products before being treated according to the present process for the isolation and purification of the 1,2-dinitro derivative. If desired, however, the entire crude reaction product may be treated as herein described. The process is also applicable to dinitro compounds of the present class which have previously been isolated and partially purified by conventional methods. Thus, for example, 1,2-dinitrocyclohexane which has been isolated and purified to a purity of, say, 95 per cent may be treated according to the invention for further purification.

While the foregoing examples illustrate the process of the invention as applied to the isolation and purification of 1,2-dinitrocyclohexane and 1,2-dinitro-ethane, it is to be understood that such process is applicable in general to the purification of any compound selected from the class consisting of aliphatic and cycloaliphatic dinitro hydrocarbons in which the two nitro groups are attached to adjacent carbon atoms. As examples of such compounds there may be mentioned 1,2-dinitrocyclopentane, 1,2-dinitropropane, 2,3-dinitrobutane, 2,3-dinitro-4-methylheptane, 2,3-dinitro-1,1-dimethylcyclopentane, 2,3-dinitroethylcyclohexane, 2,3-dinitropentane, 1,2-dinitrocycloheptane, 3,4-dinitro-octane, 1,2-dinitro-octadecane, etc. The process is also applicable to the purification of dinitro compounds of the present class which also contain substituents which are non-reactive towards nitric acid, e. g. halogen groups and the like.

Other modes of applying the principle of our invention may be employed instead of those explained, change being made as regards the materials or methods employed provided the step or steps stated by any of the following claims, or the equivalent of such stated step or steps, be employed.

We, therefore, particularly point out and distinctly claim as our invention:

1. The method of separating a compound selected from the class consisting of saturated aliphatic and cycloaliphatic dinitro hydrocarbons in which the two nitro groups are attached to adjacent carbon atoms from admixture with other normally incident nitrated compounds including isomeric dinitro compounds, which comprises heating said mixture with nitric acid to selectively oxidize substantially all of said other nitrated compounds, and thereafter separating said vicinal dinitro hydrocarbon from the reaction mixture substantially free from other nitrated compounds including isomeric dinitro-compounds.

2. The method of separating a compound selected from the class consisting of saturated aliphatic and cycloaliphatic dinitro hydrocarbons in which the two nitro groups are attached to adjacent carbon atoms from admixture with other normally incident nitrated compounds including isomeric dinitro compounds, which comprises heating said mixture with nitric acid at a temperature between about 80° C. and about 300° C. until substantially all of said other nitrated compounds are oxidized, and thereafter separating said dinitro vicinal hydrocarbon from the oxidized mixture substantially free from other nitrated compounds including isomeric dinitro-compounds.

3. The method of separating a compound selected from the class consisting of saturated aliphatic and cycloaliphatic dinitro hydrocarbons in which the two nitro groups are attached to adjacent carbon atoms from admixture with other normally incident nitrated compounds including isomeric dinitro compounds, which comprises heating said mixture with an excess of aqueous nitric acid of from about 5 to about 90 per cent concentration at a temperature between about 100° C. and about 200° C. until substantially all of said other nitrated compounds are oxidized, and thereafter separating said vicinal dinitro hydrocarbon from the oxidized mixture substantially free from other nitrated compounds including isomeric dinitro-compounds.

4. The method of separating a compound selected from the class consisting of saturated aliphatic and cycloaliphatic dinitro hydrocarbons in which the two nitro groups are attached to adjacent carbon atoms from admixture with other normally incident nitrated compounds including isomeric dinitro compounds, which comprises heating said mixture with an excess of nitric acid of from about 30 to about 70 per cent concentration at reflux temperature until substantially all of said other nitrated compounds are oxidized, diluting the oxidized mixture with water, separating the non-aqueous phase, and crystallizing said vicinal dinitro hydrocarbon from said non-aqueous phase.

5. The method of claim 1 in which the dinitro hydrocarbon is a cycloaliphatic dinitro hydrocarbon.

6. The method of claim 1 in which the dinitro hydrocarbon is 1,2-dinitrocyclohexane.

7. The method of claim 2 in which the dinitro hydrocarbon is 1,2-dinitrocyclohexane.

8. The method of claim 3 in which the dinitro hydrocarbon is 1,2-dinitrocyclohexane.

9. The method of claim 4 in which the dinitro hydrocarbon is 1,2-dinitrocyclohexane.

10. The method of separating a compound selected from the class consisting of saturated aliphatic and cycloaliphatic dinitro hydrocarbons in which the two nitro groups are attached to adjacent carbon atoms from admixture with isomeric dinitro hydrocarbons including isomeric dinitro compounds, which comprises heating said mixture with an excess of aqueous nitric acid of from about 30 to about 70 per cent concentration at a temperature between about 100° C. and about 200° C. until substantially all of said isomeric dinitro hydrocarbins are oxidized, and thereafter separating said vicinal dinitrohydrocarbon compound from the oxidized mixture substantially free from other nitrated compounds including isomeric dinitro-compounds.

11. The method of separating 1,2-dinitrocyclohexane from admixture with isomeric dinitrocyclohexanes, which comprises heating said mixture with an excess of aqueous nitric acid of from about 30 to about 70 per cent concentration at a temperature between about 100° C. and about 200° C. until substantially all of said isomeric dinitro cyclohexanes are oxidized, and thereafter separating 1,2-dinitrocyclohexane from the oxidized mixture substantially free from other nitrated compounds including isomeric dinitrocompounds.

THOMAS F. DOUMANI.
ROBERT W. LONG.

REFERENCES CITED

The following references are of record in the file of this patent:

UNITED STATES PATENTS

| Number | Name | Date |
|---|---|---|
| 2,465,984 | Doumani et al. | Mar. 29, 1949 |